Sept. 6, 1966 HANS-OTTO SCHIEDRUM ETAL 3,270,371
AXIAL EXTRUDER HEAD WITH MANDREL FOR EXTRUDING HOLLOW PROFILES
Filed March 15, 1965
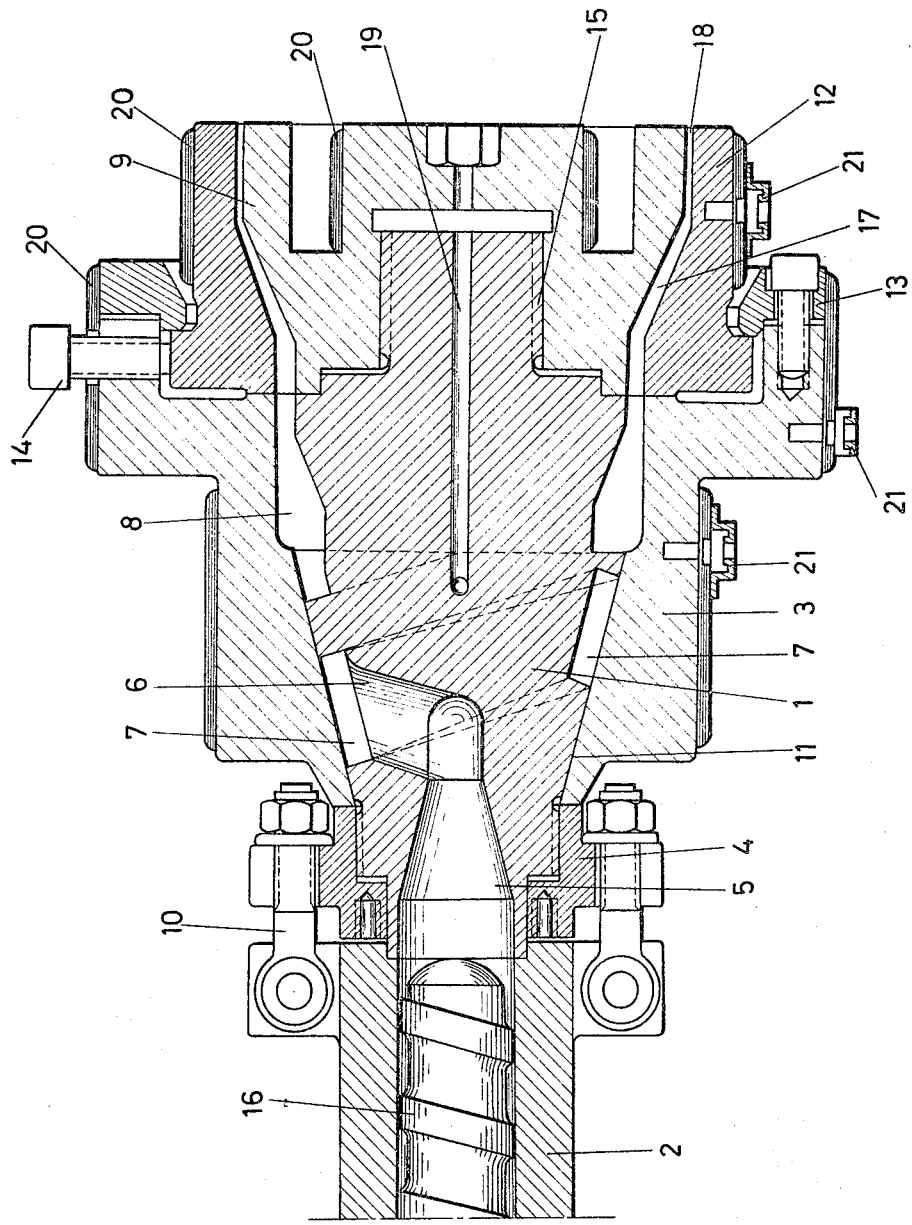
INVENTORS
HANS-OTTO SCHIEDRUM
KURT WORRET
BY Curtis, Morris & Safford
ATTORNEYS

3,270,371
AXIAL EXTRUDER HEAD WITH MANDREL FOR EXTRUDING HOLLOW PROFILES

Hans-Otto Schiedrum, Kelkheim, Taunus, and Kurt Worret, Frankfurt am Main, Germany, assignors to Farbwerke Hoechst Aktiengesellschaft vormals Meister Lucius & Bruning, Frankfurt am Main, Germany, a corporation of Germany
Filed Mar. 15, 1965, Ser. No. 439,739
Claims priority, application Germany, Mar. 18, 1964, F 42,356
4 Claims. (Cl. 18—14)

The present invention relates to an axial extruder head with mandrel for extrusion apparatus for extruding thermoplastic materials into hollow profiles.

It has been proposed to support the mandrel used when extruding hollow profiles by webs which are disposed in the extrusion passage. The webs are radially arranged and have a stream-line cross-section which is as small as possible. The webs subdivide the plastic material as it passes them and flow-marks of the sub-division are left which appear in the finished profiles of several of the plastic materials as marks or cracks or lead to an irregular wall thickness.

It has also been proposed to mount the mandrel on a breaker plate, but it is found that the plate also produces marks because the plastic material is subdivided by the breaker plate and does not weld together satisfactorily subsequently. Attempts have been made to remove the aforesaid disadvantages by arranging baffles after the webs or the breaker plate. Those baffles are intended to distort the even flow of material and thereby to remove any marks left by the re-welding of the material. For the same purpose, conical orifices and mandrels tapering in the direction of the orifice have also been used. In this case the diameter of the extruder head must be substantially larger than the hollow section. In spite of the complicated apparatus required by the measures just described, they are of little effect. They fail to produce the desired effect especially when thick-walled tubes are to be produced which have to meet high standards as regards the uniformity of the wall thickness.

U.S. Patent 3,069,724 describes a mandrel-carrier constructed in the form of an elongated hollow body the wall of which has a plurality of apertures. Owing to the fact that the holes of the screen are disposed vertically to the flow of the plastic material, the direction of flow of the material is changed and flow marks no longer occur.

All these known types of construction have as common characteristic that the carriers supporting the mandrel are relatively weak since the cross-section of the webs disposed in the extrusion passage or the partition walls among the apertures must be as small as possible. For this reason, all hitherto known constructions of mandrel carriers withstand rather badly high extrusion pressures which may occur in modern, large extrusion installations, for example also in installations for blow-molding large hollow bodies, in which there may also occur high pressure impact stresses and pressures which are suddenly built up.

To overcome the disadvantages of the known constructions, the present invention provides an axial extruder head with mandrel for extruding hollow profiles, in which the mandrel carrier is directly connected to the extruder cylinder and carries the housing of the extruder head by means of a conical or cylindrical fit, a channel system serving as passage for the material from the extruder to the orifice, said channel system commencing centrally in the mandrel carrier, leading at one or several positions radially through the mandrel carrier to the exterior to one or several passages between the mandrel carrier and the housing of the extruder head and finally ending in an annular channel for the distribution of the material disposed between the mandrel and the housing of the extruder head.

In this construction the mandrel carrier is designed in the form of a stable carrier element which is directly secured to the extruder cylinder, for example by flange or screw connection. Owing to this construction, the mandrel carrier can withstand even the highest pressures. The housing of the extruder head is placed on the mandrel carrier on the outside, for example by means of a conical or cylindrical fit with or without collar and secured, for example, by clamping with a screw flange. In contradistinction to the conventional extruder heads, the housing of the extruder head is carried by the mandrel carrier. On the side which faces the extruder cylinder, the mandrel carrier is provided with a bore constructed in the form of a blind-end bore which communicates with the surface of the mandrel carrier by means of one or several radially arranged channels for the issue of the material. The radial channel or channels open out into axially or, preferably, spirally arranged channels which, between mandrel and housing, lead to an annular channel for the distribution of the material. When using a material which has a pronounced tendency towards the formation of flow marks, there has been found to be especially suitable the construction in which the connecting channel between the radially arranged channels and the channel for the distribution of the material is conducted spirally around the mandrel carrier. In this case the extruded material passes from the extruder cylinder into the bore of the mandrel carrier and is discharged to the exterior via the radial bores. The material then flows through the spiral channel around the mandrel carrier and tangentially enters the distribution channel, owing to which arrangement any flow marks are avoided in the hollow profiles. This enables the construction of a very compact extruder head having small dimensions which is suitable also for the extrusion of large hollow profiles since, owing to the lack of flow marks, the mandrel screwed on the mandrel carrier can be designed such that its diameter increases in the direction of the orifice relief.

In spite thereof, the stability of the construction according to the invention is higher than in the case of all other known constructions since the mandrel carrier itself is designed as a carrier element and is flanged directly to the extruder cylinder. The yielding of the mandrel which otherwise easily occurs owing to pressure differences in the extruder head and which occurs in the conventional extruder heads (especially in the case of large tube diameters and small wall thicknesses) owing to the fact that the mandrel, for reasons of flow technique, can be secured in the housing of the extruder head only by carrier elements of a small cross-section, is avoided when constructing the mandrel-carrier as carrier element in accordance with the present invention. Moreover, when the temperature in the head of the extruder is controlled in an appropriate manner, the spiral channel facilitates the plastification and homogenizing of the extruded material.

While the upper pressure limit in the normal extrusion process lies at 350 to 400 kp./cm.$^2$, pressures of up to about 800 kp./cm.$^2$ in the material prevail in the modern machines for blow molding hollow bodies, which are constructed as pusher-type extruder screws. Since the known constructions of extruder heads (owing to the weak mandrel carrier) can only withstand pressures within the range of about 200 to 400 kp./cm.$^2$, the construction in accordance with the invention offers the only possibility of extruding tubes of large diameters under pressures exceeding 400 kp./cm.$^2$ in an unobjectionable manner owing to the greater stability and more compact construction of the extruder head and owing to the fact that the tube is absolutely free from flow marks. The extruder head according to the invention can be connected in known manner to horizontal blow-molding machines by means of a pipe bend as pipe elbow.

The attached figure shows, as an example of an embodiment of the invention, a device in longitudinal section for carrying out the method.

The mandrel carrier 1 is directly secured to the extruder cylinder 2 by a screwed-on flange 4 and hasp screws 10. The housing of the extruder head 3 is clamped by means of a conical fit 11 on the mandrel carrier 1 by means of a screw flange 4. The removable orifice 12 is secured by a flanged ring 13 to the extruder head 3 in known manner and is centered by means of screws 14 with respect to the likewise removable mandrel 9. The mandrel 9 is screwed on the mandrel carrier 1 by means of a thread 15. The material conveyed in the cylinder 2 by the extruder screw 16 flows through the bore 5 in the mandrel carrier 1 into the radial bore 6 and then through the spiral channel 7 milled in the mandrel carrier into the annular distribution channel 8, from where it flows via a channel 17 to the orifice relief 18. Supporting air, if needed, may be passed in via a bore 19. The housing, the orifice and the mandrel can be heated by heatings 20 to the desired temperature which is controlled by thermo-elements 21.

We claim:
1. An axial extruder head with mandrel for extruding hollow profiles which comprises a mandrel carrier being directly connected to the extruder cylinder and carrying the housing of the extruder head by means of a conical fit, a channel system serving as passage for the material from the extruder to the orifice, said channel system beginning centrally in the mandrel carrier and leading at at least one position radially through the mandrel carrier to the exterior to at least one spiral channel between the mandrel carrier and the housing of the extruder head and finally ending in an annular channel for the distribution of the material between the mandrel and the housing of the extruder head.

2. An axial extruder head with mandrel for extruding hollow profiles which comprises a mandrel carrier being directly connected to the extruder cylinder and carrying the housing of the extruder head by means of a cylindrical fit, a channel system serving as passage for the material from the extruder to the orifice, said channel system beginning centrally in the mandrel carrier and leading at at least one position radially through the mandrel carrier to the exterior to at least one spiral channel between the mandrel carrier and the housing of the extruder head and finally ending in an annular channel for the distribution of the material between the mandrel and the housing of the extruder head.

3. An axial extruder head as defined in claim 1, wherein the connecting spiral channel is disposed between the radially arranged bores in the mandrel carrier and opens out tangentially into the distribution channel.

4. An axial extruder head as defined in claim 2, wherein the connecting spiral channel is disposed between the radially arranged bores in the mandrel carrier and opens out tangentially into the distribution channel.

References Cited by the Examiner

UNITED STATES PATENTS

| 2,258,025 | 10/1941 | Morris et al. | 18—14 |
| 3,069,724 | 12/1962 | Schiedrum | 18—14 |
| 3,106,746 | 10/1963 | Sunday | 18—14 X |
| 3,203,048 | 8/1965 | Danbenfeld | 18—14 |

WILLIAM J. STEPHENSON, *Primary Examiner.*